June 6, 1961
H. T. HODGES
2,987,602
TEMPERATURE CONTROL SYSTEM FOR A
PHOTOGRAPHIC COPYING APPARATUS
Filed Jan. 26, 1959
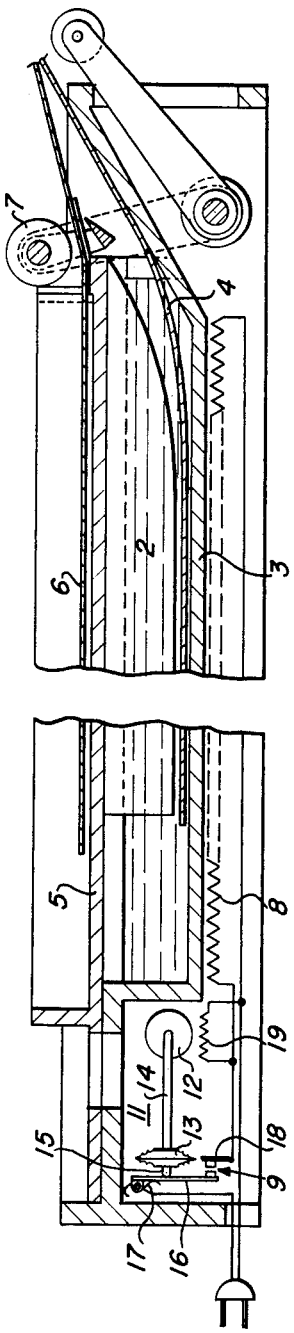
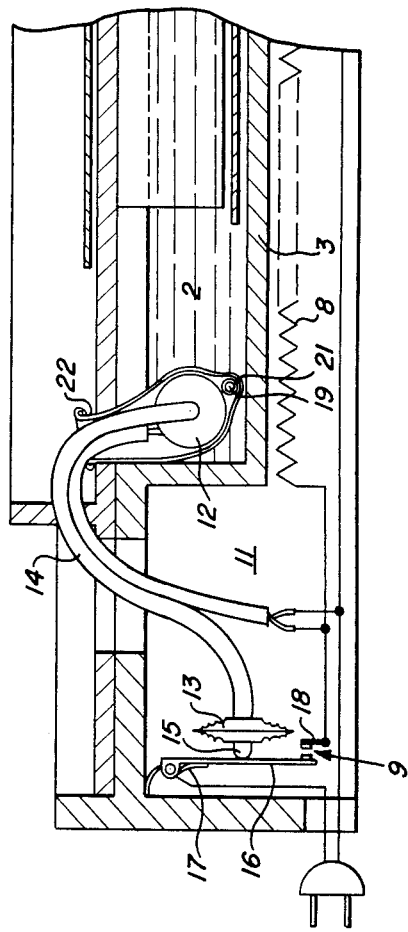
HOWARD T. HODGES
INVENTOR.
BY R. Frank Smith
Steve W. Grenshaw
ATTORNEYS

United States Patent Office 2,987,602
Patented June 6, 1961

2,987,602
TEMPERATURE CONTROL SYSTEM FOR A PHOTOGRAPHIC COPYING APPARATUS
Howard T. Hodges, Rochester, N.Y., assignor to Eastman Kodak Company, Rochester, N.Y., a corporation of New Jersey
Filed Jan. 26, 1959, Ser. No. 789,048
3 Claims. (Cl. 219—20)

This invention relates generally to a photographic copying apparatus, and more specifically to an improved temperature-control system for the processing solution of a photographic processing and image-transfer device.

In a photographic copying apparatus in which an exposed sensitized photographic sheet is processed in a suitable processing solution and withdrawn in contact with a second sheet, which is non-sensitized, to cause transfer of an image from the first sheet to the second, it is necessary for optimum operating efficiency that the temperature of the processing solution be maintained at a substantially constant value. In apparatus of this type, a temperature variance in the processing solution of several degrees will produce unsatisfactory results.

One possible way of maintaining the processing solution at a substantially constant value is to provide a thermostatically controlled heating unit for the processing solution. Where a sensitive, high-precision thermostat having less than a 1° temperature differential from the "off" to the "on" position is used, satisfactory temperature control is achieved. The disadvantage of this system, however, is that a high-precision thermostat is complicated and costly. Where a low-cost, low-precision thermostat is used of the type having a temperature differential of about 2° from the "off" to the "on" position, the fluctuation in temperature of the processing solution is too great for efficient operation of the copying apparatus. The fluctuation in the temperature of the processing solution resulting from the insensitivity of the thermostat is further augmented by an "overshoot" condition which is caused by the heat retained in the heating element and associated metal parts after the heater is switched off which tends to cause the solution temperature to increase even further. Efforts have been made in the past to minimize this "overshoot" condition by extending the heating element so that more heat is directed at the sensing element of the thermostat. Although this has reduced the "overshoot" condition, it has the disadvantage of holding the thermostat in the "off" position for too long a time as a result of the retained heat in the heating element. The extension of the heating element presents a further problem in that the thermo-conductivity in the area between the heating element and the sensing element of the thermostat must be carefully engineered and maintained to maintain optimum heater-to-bulb coupling. The maintenance of proper coupling between the heater and bulb presents a difficult engineering problem due to the thermo lags and thermo mass of the various elements of the system. The unsatisfactory temperature fluctuation of the processing solution resulting from the use of a low-cost, low-precision thermostat has been substantially eliminated by applicant's improved temperature control system.

Accordingly, one of the primary objects of this invention is to provide an improved temperature control system for the processing solution of a copying apparatus for maintaining the temperature of the processing solution at a substantially constant value.

Another object of this invention is to provide an improved temperature control system for a copying apparatus for minimizing the "overshoot" condition resulting from heat retained by the heating element after the heater is turned off.

One more object of this invention is to provide an improved temperature control system for the processing solution of a copying apparatus in which the temperature sensing element of the thermostat is protected from the effect of temperature changes in the room.

Still another object of this invention is the provision of an improved temperature control system for the processing solution of a copying apparatus in which the sensing element of the thermostat is responsive to an increase in temperature of the processing solution and a heating element associated with the sensing element, and to a decrease in temperature of the processing solution only.

A further object of this invention is the provision of an improved temperature control system for the processing solution of a copying apparatus in which the sensing element of the thermostat and an electrical resistor associated therewith are encased in a containing element which is partially submerged in the processing solution.

Still another object of this invention is to provide an improved temperature control system for the processing solution of a copying apparatus that is of simple design and construction, thoroughly reliable and efficient in operation, and economical to manufacture.

Objects and advantages other than those set forth above will be apparent from the following description when read in connection with the accompanying drawing, in which:

FIG. 1 is a vertical sectional view taken along the length of a processing and image-transfer apparatus embodying one modification of a temperature control system which is shown diagrammatically and schematically; and FIG. 2 is a segmental view similar to a portion of FIG. 1 showing another modification of the invention.

Referring now to the drawings, two embodiments of the present invention are illustrated in combination with a photographic processing and image-transfer device comprising a tank 3 containing a processing solution 2 in which an exposed sensitized sheet 4 is inserted for processing, a supporting tray 5 for the non-sensitized or image-receiving sheet 6, and a mechanism 7 adapted when operated to squeegee the excess solution from the processed sheet 4 and to immediately thereafter press the sheet into intimate contact with the non-sensitized sheet 6 as the two sheets are withdrawn from the apparatus. A photographic copying apparatus of this type is disclosed in detail in U.S. Patent 2,666,384, and accordingly no further reference thereto or detailed explanation is deemed necessary.

The temperature control system for the photographic copying apparatus essentially comprises a commercially available heating element such as the "Calrod" type heater shown schematically at 8 disposed below and in close proximity with processing tank 3. The heater 8 is connected to a suitable source of electric power through a switch 9. The switch 9 is mechanically closed and opened by a thermostat 11 for connecting and disconnecting respectively the power supply to heater 8. The thermostat 11 is a commercially available device comprising a hollow cylindrical copper sensing element 12 connected to a bellows 13 by a copper tube 14. The sensing element 12, bellows 13 and tube 14 are filled with a suitable liquid having a high rate of expansion when subjected to a temperature change. The sensing element 12 as shown in FIG. 1 is disposed adjacent tank 3, and an increase or decrease in temperature of sensing element 12 causes the liquid contained therein to expand or contract respectively. The expansion and contraction of the liquid within sensing element 12 is transmitted to bellows 13 via tube 14 causing a portion of bellows 13 including a rod 15 to be moved axially in one direction or the other controlling the pivotal movement of contact 16 of switch 9 for opening or closing switch 9. The movable contact 16 of switch 9 is urged by a spring 17 toward contact 18 which is fixed. The thermostat 11 is provided with any well known means, not shown, for adjusting the thermostat, so that it may operate to close the switch at any preselected temperature. In accordance with the present invention, another heating element shown as a resistor 19 of considerably higher resistance than heating element 8 is disposed adjacent sensing bulb 12 of thermostat 11 and is connected to the power supply through switch 9.

In the embodiment of the invention disclosed in FIG. 2, elements similar to those appearing in FIG. 1 are represented by the same numerals. In FIG. 2, resistor 19 is enclosed in a sleeve 21 of dielectric material, and sensing element 12 and resistor 19 as a unit are encased within a thermoplastic-containing element 22 which is partially submerged in the processing solution 2 within tank 3. The thermoplastic-containing element 22 protects sensing element 12 and resistor 19 from the corrosive action of the processing solution 2.

In the operation of this invention, let us assume that the processing solution 2 is to be maintained at a substantially predetermined temperature value. Accordingly, when the temperature of the processing solution 2 decreases below the predetermined value, thermostat 11 closes switch 9 connecting heating element 8 and resistor 19 to the power supply. The heating element 8 applies heat to the processing solution 2 and resistor 19 directs heat to sensing element 12 of thermostat 11. Before the temperature of the processing solution 2 reaches the predetermined value, sensing element 12 which is responsive to heat produced by the processing solution 2 and resistor 19 breaks switch 9 disconnecting the power supply from heating element 8 and resistor 19. The heat retained within heating element 8 after switch 9 is broken is sufficient to raise the temperature of the processing solution a fraction of a degree above the predetermined value. The resistor 19, which is not associated with any heat retaining metal frame, cools off very rapidly after switch 9 is broken. Accordingly, after the heating element 8 and resistor 19 are disconnected from the power supply, sensing element 12 of thermostat 11 is responsive only to a decrease in temperature of the processing solution 2. The use of resistor 19 increases the number of heat cycles per minute thus providing smaller temperature drift in the controlled solution between cycles. With this improved temperature control system, even though the thermostat 11 may have a temperature differential between the "on" and "off" positions of two degrees or more, the temperature of the processing solution 2 is maintained substantially constant, varying only a fraction of a degree on either side of the predetermined value.

The invention has been described in detail with particular reference to preferred embodiments thereof, but it will be understood that variations and modifications can be effected within the spirit and scope of the invention as described hereinabove and as defined in the appended claims.

I claim:

1. In a temperature control system for the processing solution in a tank of a photographic copying apparatus, the combination comprising a first electrical resistor associated with said tank for heating said processing solution; a source of electrical power; means for selectively connecting said first resistor to said source of power and including a switch movable from an open to a closed position for this purpose; a liquid-filled thermostat for controlling said switch and including a bellows responsive to expansion and contraction of said liquid and having a portion thereof in direct engagement with said switch, a sensing element associated with said tank to respond to the temperature of the solution therein, and a tube hydraulically interconnecting said bellows and said sensing element; and a second electrical resistor connected in circuit with said first resistor so as to be connected to and disconnected from said source of power when said switch is closed and opened, respectively; said second resistor being disposed in close proximity to said sensing element of said thermostat so that when energized it applies heat to said sensing element in addition to that emanating from said processing solutions, whereby when said switch is closed the thermostat responds to an increase in the temperature of the processing solution plus heat from said second resistor and when the switch is open it respond only to a decrease in the temperature of said solution to maintain the temperature of said solution substantially constant.

2. The invention according to claim 1 wherein said second resistor and said sensing element are encased within a thermoplastic containing element, and said containing element is adapted to be partially submerged in said processing solution.

3. The invention according to claim 1 wherein said second resistor and said sensing element are disposed in said processing solution.

References Cited in the file of this patent

UNITED STATES PATENTS

| | | |
|---|---|---|
| 2,611,850 | Walton | Sept. 23, 1952 |
| 2,824,942 | Engelhardt et al. | Feb. 25, 1958 |
| 2,883,506 | Jordan | Apr. 21, 1959 |
| 2,883,507 | Lewis et al. | Apr. 21, 1959 |